US008659434B2

(12) United States Patent
Sanger

(10) Patent No.: US 8,659,434 B2
(45) Date of Patent: Feb. 25, 2014

(54) SYSTEM AND METHOD FOR REDUCING RECIDIVISM AND AID IN TRANSITION FROM A STRUCTURED LIVING SITUATION TO A LESS STRUCTURED SITUATION

(76) Inventor: Joan Sanger, Waterloo (CA)

( * ) Notice: Subject to any disclaimer, the term of this patent is extended or adjusted under 35 U.S.C. 154(b) by 172 days.

(21) Appl. No.: 11/932,717

(22) Filed: Oct. 31, 2007

(65) Prior Publication Data

US 2008/0122613 A1 May 29, 2008

Related U.S. Application Data

(60) Provisional application No. 60/867,603, filed on Nov. 29, 2006, provisional application No. 60/999,756, filed on Aug. 27, 2007.

(51) Int. Cl.
*G08B 23/00* (2006.01)

(52) U.S. Cl.
USPC .............. 340/573.3; 340/573.1; 340/573.4

(58) Field of Classification Search
USPC ................... 340/573.4, 573.1, 573.3
See application file for complete search history.

(56) References Cited

U.S. PATENT DOCUMENTS

| | | | |
|---|---|---|---|
| 5,146,207 A | 9/1992 | Henry et al. | |
| 5,917,781 A * | 6/1999 | Kim | 369/4 |
| 5,977,913 A * | 11/1999 | Christ | 342/465 |
| 6,054,928 A * | 4/2000 | Lemelson et al. | 340/573.4 |
| 6,072,396 A * | 6/2000 | Gaukel | 340/573.4 |
| 6,283,761 B1 * | 9/2001 | Joao | 434/236 |
| 6,362,778 B2 * | 3/2002 | Neher | 342/357.75 |
| 6,405,213 B1 * | 6/2002 | Layson et al. | 707/758 |
| 6,437,696 B1 * | 8/2002 | Lemelson et al. | 340/573.4 |
| 6,611,206 B2 * | 8/2003 | Eshelman et al. | 340/573.1 |
| 6,738,635 B1 | 5/2004 | Lewis et al. | |
| 6,920,328 B2 * | 7/2005 | Wollrab | 455/456.1 |
| 7,043,443 B1 * | 5/2006 | Firestone | 705/7.14 |
| 7,174,268 B2 * | 2/2007 | Katsuki et al. | 702/131 |
| 7,177,699 B2 | 2/2007 | Fabian et al. | |
| 7,603,315 B2 * | 10/2009 | Ross | 705/43 |
| 7,812,717 B1 * | 10/2010 | Cona et al. | 340/506 |
| 8,045,455 B1 * | 10/2011 | Agronow et al. | 370/229 |
| 2002/0120554 A1 * | 8/2002 | Vega | 705/37 |
| 2003/0065805 A1 * | 4/2003 | Barnes, Jr. | 709/231 |
| 2004/0215793 A1 * | 10/2004 | Ryan et al. | 709/229 |
| 2005/0136949 A1 * | 6/2005 | Barnes, Jr. | 455/461 |
| 2005/0171816 A1 | 8/2005 | Meinert et al. | |
| 2007/0013527 A1 | 1/2007 | Sloan | |
| 2007/0118426 A1 * | 5/2007 | Barnes, Jr. | 705/14 |
| 2008/0082393 A1 * | 4/2008 | Ozzie et al. | 705/10 |

OTHER PUBLICATIONS

Career Edge System, p. 1, Apr. 15, 2007.
Texas Workforce, "Project RIO (Re-Integration of Offenders)", pp. 1-2, Apr. 12, 2007.
Texas Department of Criminal Justice, Texas Workforce Commission, Texas Youth Commission, "Project RIO Strategic Plan, Fiscal Years 2006-2007", pp. 1-81 (Mar. 2006).
Intel, "Intel's Transistor Technology Breakthrough Represents Biggest Change to Computer Chips in 40 Years", pp. 1-3, Feb. 13, 2007.

\* cited by examiner

*Primary Examiner* — Jennifer Mehmood
*Assistant Examiner* — Rufus Point
(74) *Attorney, Agent, or Firm* — Mattingly & Malur, PC

(57) ABSTRACT

Electronic systems and methods provide services in real time and in a user's language to aid transition from a structured environment into a less structured situation and reduce recidivism in released criminal offenders. Embodiments also include systems and methods for improved outcomes for subjects in transition from a structured living situation into a less structured or free society environment, such as subjects in transition out of a hospital, educational institution or military service.

19 Claims, No Drawings

SYSTEM AND METHOD FOR REDUCING RECIDIVISM AND AID IN TRANSITION FROM A STRUCTURED LIVING SITUATION TO A LESS STRUCTURED SITUATION

CROSS-REFERENCE TO RELATED APPLICATIONS

This application claims benefit of priority to U.S. Provisional Application No. 60/867,603, filed Nov. 29, 2006 and U.S. patent application Ser. No. 11/845,516, filed Aug. 27, 2007, both of which are incorporated herein in their entirety by reference.

STATEMENT REGARDING FEDERALLY SPONSORED RESEARCH OR DEVELOPMENT

N/A

BACKGROUND

According to statistics compiled by the Department of Justice's Bureau of Justice, nearly 5 million Americans were subject to probation or parole jurisdiction at year end 2005. Monitoring the activity of these parolees and probationers, ensuring their compliance with court-ordered conditions and facilitating a smooth transition into a free and law-abiding life represents a significant expenditure of public resources. In 2006, the State of Texas alone spent $2.5 billion to house 151,741 adult inmates (a cost of $16,475 per inmate) in 115 state prisons. These costs will almost certainly increase over the coming years, as the number of inmates is projected to increase by 7% annually.

Currently, penal institutions facilitate the transition from incarceration to parole by providing the parolee with only a minimum amount of useful information. Usually, this information is provided via paper forms or pamphlets. Other types of persons released from structured environments also are in need of similar support. The format of this information does not lend itself to ease of use or efficiency nor is it capable of being regularly updated. Also, such practices typically do not integrate pre-release and post-release programs.

The State of Texas has instituted an innovative program, known as Project RIO, which aims to reduce recidivism through pre- and post-release employment assistance to incarcerated persons. Institutionalized persons are provided information, training and placement assistance before and after release from jail. However, this information is typically gathered by instructors and correctional officials and distributed to the offenders in a piecemeal, disorganized fashion. The system is also decentralized. Furthermore, Project RIO is no longer tracking recidivism. A system for providing many more comprehensive services, as well as streamlining and centralizing the process, is necessary to ensure the project's success.

An on-line career planning software tool, the Career Edge System ("CES"), is currently available. CES provides a full-service career planning program, available on-line at the CES website for readers and non-readers in Spanish and English. However, this program has not yet been offered to probationers and institutionalized individuals and those exiting, or needing support to avoid, a structured environment, nor has it been integrated as part of a probationary, parole, post release structured environment program, or other correctional program.

Systems and methods for providing management of a program of correctional supervision via a stored-value card have previously been proposed. The card can be used to access funds in a designated account. Funds from receipt of public benefits or employment compensation are transferred into the parolee's account. The parolee can use the stored-value card to purchase goods, pay bills, etc. The parole officer can access the account records and monitor the parolee's employment status and purchasing habits. While this system provides ample benefit to the parole officer and convenience to the parolee, it does not provide the parolee with information about services available to him. Additionally, this system fails to prepare the parolee for integration into the outside world prior to the parolee's release. Parolee or probationer monitoring systems are also known and used that utilize GPS positioning systems to monitor the location of a GPS receiver attached to the probationer or parolee.

Also known is a system and method for wireless schedule notification. Notification can be sent wirelessly to remind users of events noted on a schedule maintained on a central computer system. Such a system has not been applied to notify probationers or institutionalized individuals of scheduled appointments or to facilitate the provision of probation or post-release services.

There is thus a need for a system and method for providing offenders such as inmates, probationers, or parolees, other institutionalized persons, persons in the military, or students, pre- and post-release (or -discharge or -graduation), with an interactive, detailed and personalized guide for access and use of relevant social support and career services. Preferably, the system includes one or more portable electronic devices or media for accessing and using data relating to probationary or post-release services.

SUMMARY OF THE INVENTION

The present invention addresses at least some of the shortcomings of the previous art by providing a comprehensive, accessible and easy-to-use system that provides information relevant to the release and transition of an offender or institutionalized or hospitalized person, or a person in transition from, or in need of support to avoid, a structured environment such as the military service, into the society at large.

Individuals or subjects such as prison inmates, institutionalized troubled youth, mental patients, probationers and/or parolees, elderly or handicapped individuals, those with substance abuse problems, immigrants, and those in transition from a military or educational institution potentially need some or all of the following information and services, which are chosen for the individual on an as-needed basis, with any and all types of data potentially being used and transferred as described below: career assessment, planning and exploration; drug and alcohol counseling, any rehabilitative courses and advice; advice on local resources in their respective communities; information on life skills, budgeting, relaxation exercises, critical thinking skills, peer support and healthy peer choices; information on health issue and services; literacy programs; job training programs; actual jobs available; mentoring support; job finding; social services and real time remote or recorded video counseling; appropriate workplace behavior and dress; anger and impulse management; calendar conflict management and responsibility management between work and child welfare; custody and support issues; parenting skills and family reunification support; job retention support training videos and counseling; SSI and Medicaid support and assistance; room and board issue assistance; finding housing and related issues; child care assistance, support and training; banking and financial literacy; Traumatic Brain Syndrome services and assistance; veterans services and assistance; information and assistance in obtaining a driver's license or other identification card or paperwork; daily living and positive leisure assistance; correctional history and assessment information; and a GPS locator and mapping program which can be programmed for each user's needs.

If a person is in, or needing support to avoid, a correctional or mental health institution, youth correctional, institutional, mental health facility, military service or school, he or she will need certain information and services such as those listed above prior to release, discharge or graduation and will need another set of information and services following release in order to make a successful transition from a structured environment to society at large. The criteria for a successful transition can include, for example, the reduced chance of a return to illegal activities or another incarceration, the initiation of a successful career or other benchmarks for success.

In certain embodiments, a system is provided for aiding those in transition from military service into the larger society. Such a system provides not only services provided by government agencies such as the Veteran's Administration or other federal or state agencies, but can also provide the same or similar services provided by private companies, health care providers or networks to civilians in transition.

These services can be brought into the facilities and/or delivered to the individual either through a local area network, through an internet delivery system, or through software systems embedded in computer readable media. The services can be made available in audio format and in several different languages, so that they are accessible to various subjects such as probationers, institutionalized individuals, and others who are illiterate and/or do not speak or read English.

The information can be provided to the subject either electronically through a wireless internet or intranet connection to a portable electronic device, or by transfer of data to a portable storage medium such as a portable disk, hard disk within a device, CD, DVD, memory stick or other memory device that requires a computer, player or other portable device to access the information. The system includes one or more servers optionally including but not limited to an applications server that can be located within an institution, or facility or can be accessible by a terminal in the institution or facility and by others within the correctional, justice, health, military or educational systems such as probation officers or case workers, for example, and is connected to one or more database servers containing the data to be provided to the subject.

The portable device can be any known portable device, typically with a display monitor, speakers and a keyboard or input device.

DETAILED DESCRIPTION

The present disclosure is primarily directed to the systems and methods to facilitate the successful transition of a subject transitioning from a structured environment to a less structured living situation, or those in need of support to avoid a structured environment, such as society at large. In a preferred embodiment, the system is used by penal institutions, probation officers, inmates and parolees to reduce recidivism, in which the systems and methods provide a comprehensive, individually tailored tool for providing support before and during the transition from living in an institution to living in free society. Besides prisons, correctional facilities and probationary periods, other examples of structured environments include mental and health institutions, assisted living, military service or educational institutions. Potential subjects include prisoners, probationers, parolees, institutionalized individuals, troubled youth, mental health patients, immigrants, handicapped, elderly, those with substance abuse problems, military personnel, students and others entering a new societal or alien environment. In preferred embodiments, the systems are directed to providing services to a user. Services include, but are not limited to real time, detailed information related to improving the probability of a successful transition, such as information related to any of career assessment, planning and exploration; drug and alcohol counseling, any rehabilitative courses and advice; advice on local resources in their respective communities; information on life skills, budgeting, relaxation exercises, critical thinking skills, peer support and healthy peer choices; information on health issue and services; literacy programs; job training programs; actual jobs available; mentoring support; job finding; social services and real time remote or recorded video counseling; appropriate workplace behavior and dress; anger and impulse management; calendar conflict management and responsibility management between work and child welfare; custody and support issues; parenting skills and family reunification support; job retention support training videos and counseling; SSI and Medicaid support and assistance; room and board issue assistance; finding housing and related issues; child care assistance, support and training; banking and financial literacy; Traumatic Brain Syndrome services and assistance; veterans services and assistance; information and assistance in obtaining driver's license or other identification card or paperwork; daily living and positive leisure assistance; correctional history and assessment information; and a GPS locator and mapping program which can be programmed for each user's needs.

In certain embodiments the systems and methods include a central computer or server that can be connected to an intranet or internet network, including but not limited to the World Wide Web. The central computer can be located within an institution such as a prison, within a state or federally owned or controlled office or center, for example. The central computer includes a processor, software instructions, and includes or is connected to one or more memory storage devices. In certain embodiments the device can be a kiosk or a type of interactive surface computer such as provided by Microsoft™ Surface™.

The memory storage devices can include databases for storage of personal information about a user and a user's release program such as name, age, gender, assigned case worker, identifiers such as social security numbers, reason for incarceration or conviction, institution, release date, conditions of probation, family members and location, residence following release, health issues, addictions, job skills, religion, education, etc. The central computer can also contain or be connected to memory storage devices containing information about goods and services available to and needed by a user during the transition period and targeted to a particular location. Examples of such databases would include, but are not limited to names, locations, telephone numbers, and other information about providers of clothing, food, health services, job services, career planning, alcohol or drug addiction counseling, legal service providers etc.

The preferred systems and methods further include portable devices connectable to the central computer, either through a network such as an internet or intranet system, or directly through a disc drive, communication port or other connections known in the art, and those developed after the filing of this application. The portable device can include a memory storage device, and can also include a communication device such as a wireless antennae, a cell phone signal transmitter/receiver or a satellite signal receiver for communication with or through the internet or intranet system or to a global positioning system, for example. The device can also include a display device to display requested information to a user, and/or an audio speaker and audio drivers effective to provide audible information to a user. The devices also include software instructions for storing, accessing, and producing visual or audio communications of requested data to a user. Such devices can also include calendaring software to provide information and reminders about appointments, meetings, important dates or other events, and can provide incentives for completion of certain milestones. The incentives can be monitored by a supervisor or case worker, or can be automated to provide movie passes, coupons or gift certificates to be shown to or scanned by business establishments or printed to be utilized by the users. In certain embodiments the portable devices can include only a memory storage device such as a disc, compact disc, digital video disc, flash memory, or other memory device that requires the use of a computer to access the stored data.

In certain embodiments of the present disclosure, databases of information stored on one or more servers, are made available to correctional officials or case officers. The correctional officials or case officers can select from this database the set of information relevant to a specific probationer or institutionalized person. It is also an aspect of the disclosure that certain information can be entered into a database that identifies the subject and certain criteria such as location of residence after release, job skills, health issues, etc., and that a subset of information is selected by the system automatically for use by a subject that fits a particular profile. For example, a set of relevant information can be selected prior to a prisoner's release on parole or prior to the institution of a probationary period. The correctional officials can then use this information to tailor a plan for the probationer or confined or institutionalized person, intended to last for the duration of the probationary period, the period until their release and/or the period following their release or some subset thereof. Upon the institution of the probation or the release from an institution, the set of relevant information can be provided to the probationer or institutionalized person on an electronic medium, such as a portable memory device, a magnetic or optic memory storage medium, a portable electronic device, a portable wireless device or a personal digital assistant. The individual can thus access the relevant information as needed. Additionally, correctional officials or other supervising authorities or social service workers can continue to access the database of information as well as the relevant information and use it for data collection in order to use business intelligence software to improve and/or upgrade the future set of information. Correctional officials or other supervising authorities or social service workers can also periodically update the set of information contained on the portable electronic medium possessed by the probationer or institutionalized individual as the situation changes, or as the subject progresses in the transition out of an institution.

It is an aspect of the disclosure that an employee of the institution or correctional official or supervising authority can choose the needed resources and programs, or the choices can otherwise be made, to customize the services to each individual's needs, by selecting from, for example, the following options: career assessment, planning and exploration; drug and alcohol counseling, any rehabilitative courses and advice; advice on local resources in their respective communities they may need, life skills, budgeting, relaxation exercises, critical thinking skills, peer support and healthy peer choices; information on health issues and services; literacy programs; job training programs; and a GPS locator program. It is understood that in the case of a criminal offender, certain of the services can be restricted to prevent abuse of the system or use of the system in criminal activity. By selecting the information, the institution or correctional official or supervising authority constructs a profile tailored to the specific probationer or institutionalized person. This profile can aid the institution, correctional official or case officer in guiding pre-release and post-release programs and monitoring.

These services can be offered behind the walls of an institution through a technical delivery system that the institution decides to use based on their security requirements and needs and/or other factors. In an alternative embodiment of the system for delivering services within an institution, an institution might prefer to restrict access to outside networks because of security or other concerns. To enable provision of services behind the wall of an institution without network access, the services can be made available on a dedicated internal server or other computer that can be accessed by the correctional officials or case officers. Kiosks or other embodiments may be a type of interactive surface computer such as provided by Microsoft™ Surface™.

Officials can access this information on a personal computer or terminal. Additionally, the internal server can provide selected information and programs, such as career and other post-release or post-discharge training and planning, to institutionalized or confined individuals on a personal computer or terminal as part of a program of preparation for life outside of the walls or post-discharge. An example of such a career program is the Career Edge System ("CES"), which provides online audio and written comprehensive career guidance in both English and Spanish. The information culled during this pre-release program can be used by the correctional official or case officer to guide his continued selection of information for the institutionalized person, for example by narrowing down the range of job functions and potential employers about which information will be provided.

Upon release or post-discharge, the data, including the individual's work product in career planning and search and/or other rehabilitative or assistance in re-integration will then be transferred to the individual outside the institution or military. This is done via download to a wireless access system and/or portable device, with options to load program data into relevant web-based Internet sites, and/or other portable data transfer device to be used to store programs and data. The portable device can be based on a modular design, including modules such as connectivity, input interface, screen/display, audio output, portability, software, GPS navigation and tracking, timers to remind the user that medicine or other personal support is needed, medical and health-related clinics information, phone capabilities and pager service. The data can be made accessible in audio format and in several different languages, so that it is accessible to probationers, those discharged from the military and institutionalized or confined individuals that are reading challenged, illiterate and/or do not speak English. Additionally, a GPS locator capability can be integrated into the device to facilitate compliance monitoring by the case manager or other correctional official, and to aid the subject in traveling to needed destinations or in avoiding restricted or undesirable locations.

Individuals who are on the outside of institutions who will be assisting the individual in re-integration and/or the individual utilizing the programs can access the information and/or data to be used in rehabilitation and/or re-integration into society through these portable devices, or by connecting to the informational kiosks and/or Internet based programs the wireless devices are programmed to utilize. The data can thus be updated by the case manager or other correctional official as needed to provide for improved service or to accommodate changing circumstances.

Alternatively, the data can be provided to the subject on other portable data devices or media such as memory sticks, memory cards, CDs, DVDs, or any other suitable digital medium. Subjects can then easily carry the device or medium and access the stored data and programs from a digital device capable of accessing data stored on the device or medium. The device or medium can be carried to meetings with probation, parole or other correctional officials to facilitate ready review and updating of the data.

The system described in the specification above can also be tailored for use in conjunction with probation programs. In this case, the probationer may not have spent time behind the walls of an institution. However, the probation officer or case manager can nevertheless use the system in a fashion similar to that which the correctional institution uses the system, by selecting from information and services provided on a server to create a custom profile for a specific probationer. The information and services can then be loaded onto a portable electronic medium or device and provided to the probationer. The probationer can then use the portable device or medium to access information and services relevant to him or her.

Participation in a program of rehabilitation and/or possession of the medium or device as described herein can be required as part of the terms of probation, parole or release from an institution.

In an exemplary embodiment, an inmate reports to a case worker prior to release from a penal institution. The case worker or a clerical worker enters an inmate's profile information into a database and creates a file for the inmate. The software residing on the server then connects to and retrieves data from a variety of database servers such that the information is tailored to the inmate's profile. The data retrieved includes services and programs available to or required by the inmate prior to release. Such programs can include but are not limited to educational programs such as GED programs, for example, language skills, psychological counseling, job training, job interview skills, health or dependency counseling, and selection of location for residence such as a halfway house upon release. These data are most often accessed on a computer by the case worker rather than on a device provided to the inmate while in the institution.

When the inmate is released, he or she is given a portable device with a different set of instructions tailored to the release situation into a particular location. As an example, the inmate receives a digital assistant that provides video or audible instructions such as, location of bus stops and bus schedules, location of probation office and name of case officer, location of retail stores for purchasing clothes, toiletries, food and other essential items. The device also provides the location of and optionally a map to job placement centers, telephone numbers for appointments or counseling and dates and times for reporting for appointments.

In those devices provided with a GPS receiver, the device also provides the location of the subject and directions and/or maps to various agencies, stores, churches or other destinations as needed. The device can provide instructions for job interviewing, opening a bank account, check writing or other basic skills needed to function in society. In certain embodiments, the device includes a calendaring software program with audible reminders of appointments, instructions for traveling to the appointment and optionally encouraging statements to improve the subject's self image or to encourage compliance. It is an aspect of the disclosure that the device can also plan travel routes that avoid known areas of temptation such as bars and high crime areas or areas known to be frequented by drug users or sellers or for prostitution activity. The device might also provide an alarm function that alerts the user that he or she is in proximity to desirable locations—such as the site of a scheduled appointment, a potential employer, an available job, for example—or undesirable locations—such as dangerous or high-crime neighborhoods.

As the user is assimilated into society, the information on the device is periodically updated by a probation officer, social service officer, case officer or other supervising authority, for example, or by wireless connection by the user to a server with software that assesses the changed conditions and selects additional subsets of information for the user. It is understood that certain functions can be automated, but that a human operator can intervene at any time in the process and review those items selected by the system and either add or subtract certain information prior to its transfer to the user. Examples of a change in condition include but are not limited to: the subject obtaining a job and requiring certain clothes, uniforms or tools, a change in job situation, changes in health status, initiation or completion of educational programs, change in residence, change in frequency of drug or alcohol testing, and other changes related to the justice system or to life in society.

In another embodiment, a military serviceperson can report to a career counselor or other case worker prior to discharge from military service. The case worker or a clerical worker enters the serviceperson's profile information into a database and creates a file for the serviceperson. The software residing on the server then connects to and retrieves data from a variety of database servers such that the information is tailored to the serviceperson's profile. The data retrieved includes services and programs available to or required by the serviceperson prior to release. Such programs can include but are not limited to educational programs, language skills, psychological counseling, health services information, job training, job interview skills, calendar conflict management and responsibility management between work and child welfare; custody and support issues; parenting skills and family reunification support; job retention support training videos and counseling; SSI, VA benefits and disability support and Medicaid support and assistance; room and board issue assistance; finding housing and related issues; child care assistance, support and training; banking and financial literacy; Traumatic Brain Syndrome services and assistance; other veterans services and assistance; information and assistance in obtaining a driver's license or other identification card or paperwork; daily living and positive leisure assistance; health or dependency counseling, and selection of location for residence upon release. These data are most often accessed on a computer by the case worker rather than on a device provided to the serviceperson while serving in the military. Incentives for completion of certain milestones or as tokens of appreciation for military service can be automated to provide movie passes, coupons or gift certificates to be shown to or scanned by business establishments or printed to be utilized by the users.

When the serviceperson is discharged, he or she is given a portable device with a different set of instructions tailored to the release situation into a particular location. As an example, the serviceperson receives a portable memory device that includes information accessible in video or audio formats. Such information can include, but is not limited to, location of bus stops and bus schedules, location of veterans' services offices, video or live support of other veterans or counselors or pager support and GPS support for Post Traumatic Stress and Traumatic Brain Syndrome, and name of caseworker, job opportunities, etc. The device also provides the location of and optionally a map to job placement centers, telephone numbers for appointments or counseling and dates and times for reporting for appointments.

As the user is assimilated into society, the information on the device is periodically updated by a case officer or other supervising authority, for example, or by internet or wireless connection by the user to a server with software that assesses the changed conditions and selects additional subsets of information for the user. The supervising authorities can review the relevant information and use it for data collection in order to use business intelligence software to improve and/or upgrade the future set of information. It is understood that certain functions can be automated, but that a human operator can intervene at any time in the process and review those items selected by the system and either add or subtract certain information prior to its transfer to the user. Examples of a change in condition include but are not limited to: the subject obtaining a job and requiring certain clothes, uniforms or tools, a change in job situation, changes in health status, initiation or completion of educational programs, change in residence, change in frequency of drug or alcohol testing, and other changes related to the military service or to life in society.

The disclosed systems and methods thus provide a comprehensive support system to a subject in transition into society that provide every available opportunity for the subject to comply with the laws and regulations and to become a productive, well-functioning member of society after confinement, incarceration, the institution of probation, schooling or military service, to meet the terms of his or her probation or parole, and to successfully remain in society and out of an institution or the justice system for an extended period of time, if not for his or her lifetime.

What is claimed is:

1. An electronic system for reducing the probability for recidivism for an offender, comprising a portable electronic device for use by the offender, wherein the device comprises:
    a processor, a computer readable memory, software instructions embedded in the computer readable memory, an output device, and an antenna for receiving wireless transmissions;
    wherein the device provides real time output of services directed to the offender's location and related to at least one of finding and keeping employment; and
    wherein the output provides assistance to the offender to reduce the probability of recidivism for the offender.

2. The system of claim 1, further comprising global positioning system and mapping software.

3. The system of claim 1, wherein the output device comprises an audio driver program and a speaker for audio output, and wherein the audio output is available in a plurality of languages.

4. The system of claim 1, wherein the output comprises audio or audio and video messages offering advice, encouragement, or testimonials from the offender's peers.

5. The system of claim 2, wherein the output includes warnings when the electronic device is approaching an undesirable area, or notifications when the electronic device is approaching a location of beneficial services.

6. The system of claim 1, wherein the device further provides real time output of services related to health care, drug or alcohol counseling.

7. A method for reducing the probability of recidivism in an offender after release from a penal institution or placement on probation comprising:
    providing a portable electronic device to the offender containing a database of services that are chosen for the individual offender and are output by the portable device at preselected times or locations, and wherein the services are effective to reduce the probability of recidivism by the offender;
    wherein the services comprise a real time schedule of tasks, events, information, mentoring and reminders during a period of transition out of an institution or into a probation system and wherein the services are related to finding and keeping employment.

8. The method of claim 7, wherein the portable electronic device further comprises a global positioning system and mapping software.

9. The method of claim 7, wherein the output is audio and is available in a plurality of languages.

10. The method of claim 7, wherein the output comprises audio or audio and video messages offering advice, encouragement, or testimonials from the offender's peers.

11. The method of claim 8, wherein the output includes warnings when the electronic device is approaching an undesirable area, or notifications when the electronic device is approaching a location of beneficial service.

12. The method of claim 7, wherein the services are further related to health care, drug or alcohol counseling.

13. An electronic system for aiding a subject in transition from a structured living situation to a less structured living situation, comprising:
    an electronic device comprising a processor, a computer readable memory, software instructions embedded in the computer readable memory, an output device, and an antenna for receiving wireless transmissions;
    wherein the software provides pre-selected real time output of services selected from a schedule of tasks, events, information and reminders directed to the subject's location and wherein the services are related to finding and keeping employment; and
    wherein the output provides assistance in adjusting to the transition to a less structured living situation.

14. The system of claim 13, wherein the structured living situation is a medical, psychological, or educational institution, or military service.

15. The system of claim 13, further comprising a global positioning system and mapping software.

16. The system of claim 13, wherein the output device comprises an audio driver program and a speaker for audio output, and wherein the audio output is available in a plurality of languages.

17. The system of claim 13, wherein the output comprises audio or audio and video messages offering advice, encouragement, or testimonials from the subject's peers.

18. The system of claim 15, wherein the output includes warnings when the electronic device is approaching an undesirable area, or notifications when the electronic device is approaching a location of beneficial services.

19. The system of claim 13, wherein the software further provides real time output of services related to health care, drug or alcohol counseling.

* * * * *